H. E. GRABAU AND A C. SCHWARTZ.
TIRE CASING.
APPLICATION FILED JAN. 11, 1918.
1,347,847.
Patented July 27, 1920.
3 SHEETS—SHEET 1.
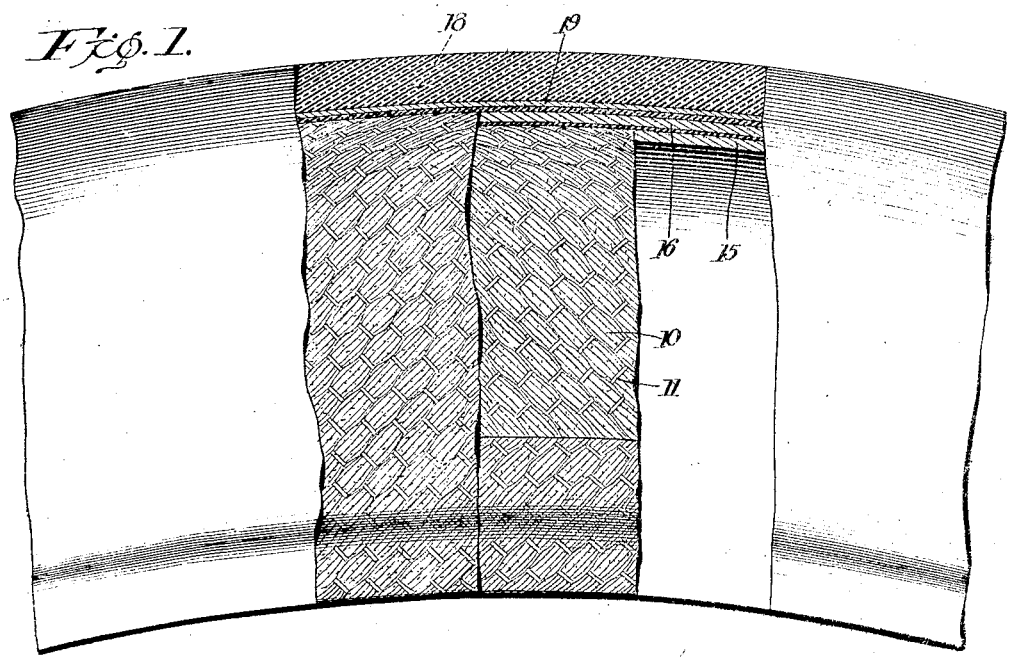
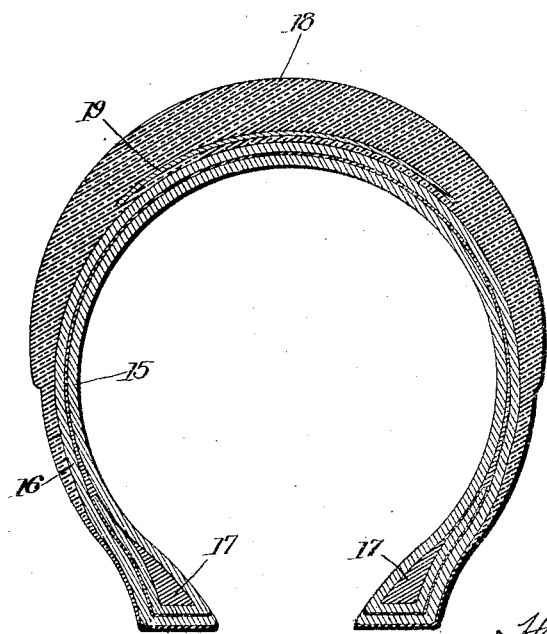

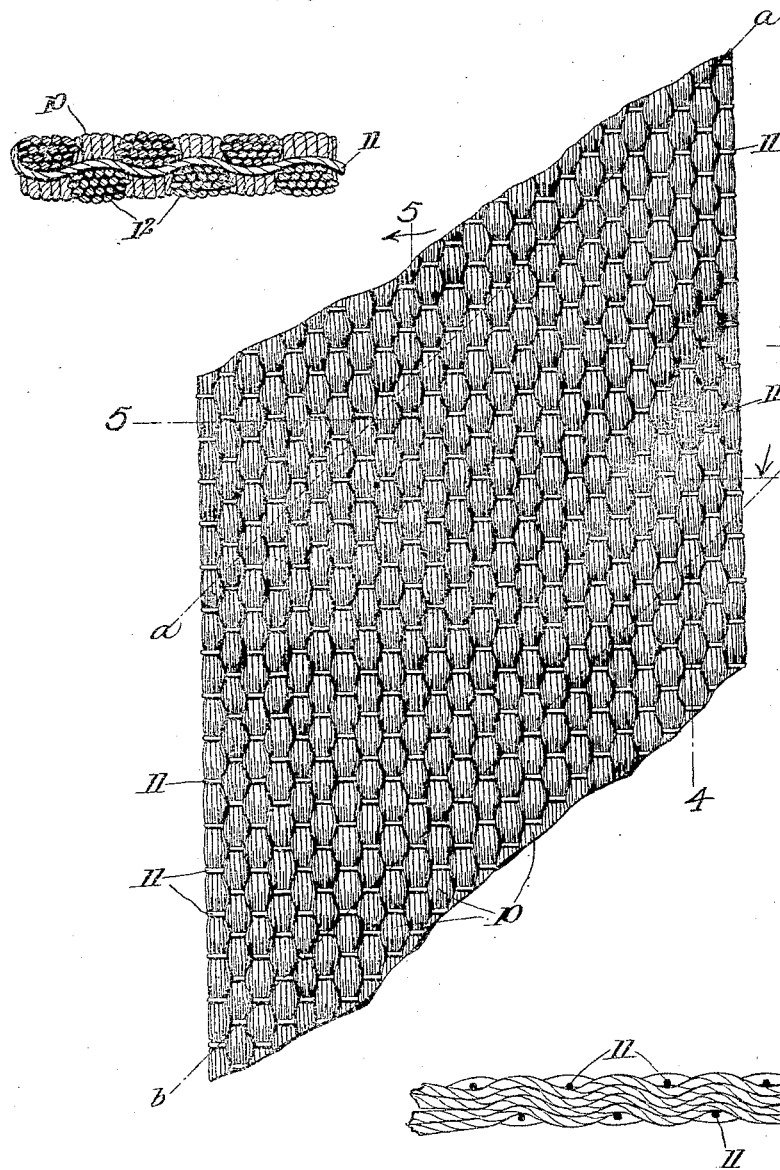

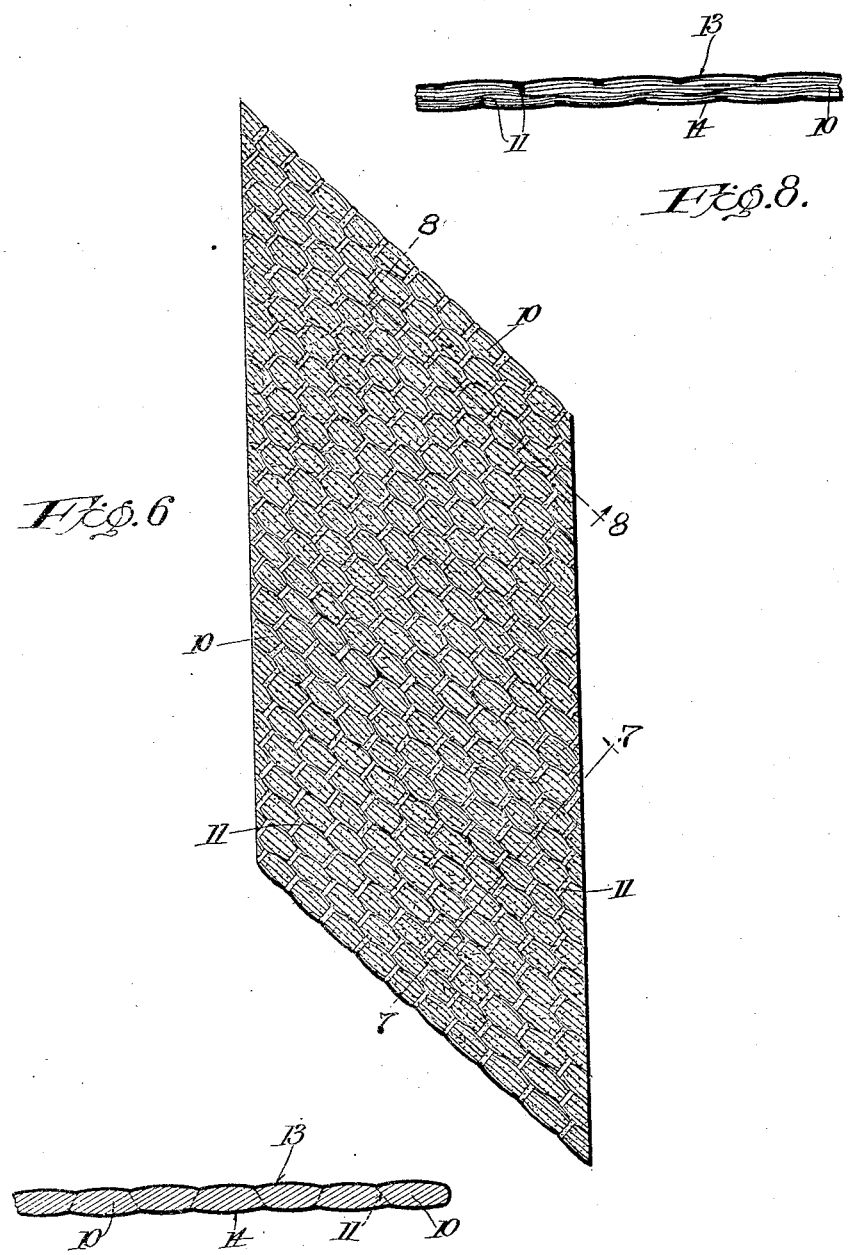

UNITED STATES PATENT OFFICE.

HANS E. GRABAU, OF LONG ISLAND CITY, AND A CHARLES SCHWARTZ, OF NEW YORK, N. Y.; SAID GRABAU ASSIGNOR TO SAID SCHWARTZ.

TIRE-CASING.

1,347,847.  Specification of Letters Patent.  Patented July 27, 1920.

Application filed January 11, 1918. Serial No. 211,373.

*To all whom it may concern:*

Be it known that we, HANS E. GRABAU, formerly a subject of the Emperor of Germany, and who has taken out his first naturalization papers, residing at Long Island City, Queens county, New York State, and A CHARLES SCHWARTZ, a citizen of the United States, residing at New York city, New York county, New York State, have invented certain new and useful Improvements in Tire-Casings, of which the following is a specification.

There are in general use at the present time two distinct types of pneumatic tires, namely, fabric tires and cord tires, the difference in the two types residing in the character of the strain-resisting material composing the foundation or so-called "carcass" of the tire shoe or casing. The cord tire is today well recognized as superior to the fabric tire, and it would undoubtedly largely replace the fabric tire but for the fact that the manufacturing cost of the cord tire is of necessity materially greater than that of the fabric tire and the use of the cord tire is hence largely confined to the higher priced automobiles.

Various attempts have heretofore been made to improve the construction of the fabric tire to embody the advantages possessed by the cord tire, and at the same time retain the lower manufacturing cost of the fabric tire.

In our prior Patent No. 1,227,425 we have described a tire casing which may be classified as regards its manufacturing method as a fabric tire, and which to a large extent overcomes the defects of prior fabric tires. The tire casing of the present application constitutes specifically an improvement on the invention of our prior patent.

As pointed out in that patent, the foundation or carcass of the fabric casing is built up by superimposing a plurality of layers of fabric which are cemented together by interposed layers of rubber and attached to the beads of the casing. Upon the carcass thus formed the rubber portion of the tire is built by a molding and vulcanizing process, the rubber uniting the several layers of fabric to form a unitary structure.

In the casing of our prior patent we sought to obviate the defects of the ordinary fabric tire by taking advantage of the difference in the stresses to which the tire is subjected in different directions by reason of the contained compressed air on the one hand and the traction stress of driving or braking the vehicle exerted through the tires, on the other. The bursting stress due to the compressed air is generally very much greater than the traction stress and acts transversely of the tire, while the traction stress on the other hand acts circumferentially or at right angles to the bursting stress. As described in our patent, we made up the carcass of the tire from annular strips of a fabric of heavy untwisted strands, each strand consisting of a number of threads lying parallel and closely adjacent, with the strands held together by spaced single warp threads of very much less strength than the bundles of threads in the other direction. This fabric was used in the tire with the heavy bundles of threads running substantially transverse from bead to bead, to resist the heavy bursting stress from the contained air, and with the lighter spaced single threads extending circumferentially of the tire to resist the stresses due to the tractive effort. There was also considerable deformation of the tire where it was in contact with the ground, due to the weight of the vehicle. So, also, we have found that when the tire was in contact with the ground, and subjected to a heavy load, it would sway sidewise. These several defects we have ascertained resulted from the lack of diagonal bracing from bead to bead of the tire, this being true even when the transverse threads were placed somewhat obliquely as explained in the patent.

In order to obviate these defects, we have ascertained that it is desirable that the strands or heavy bundles of threads, instead of extending at right angles from bead to bead of the tire should extend at an angle of 45° thereto, *i. e.*, that the strands of one layer of the fabric should extend at 45° from bead to bead in one direction, and the strands of the next layer should extend from bead to bead at an angle of 45° in the opposite direction; thereby bringing the strands of the one layer at an angle of 90° to the strands of the other layer. It was impracticable, however, from a commercial standpoint, to employ the fabric described in our Patent No. 1,227,425 in this way, for the reason that to cut that fabric on the bias would leave the transverse strands of a length insufficient to reach from bead to bead at the meeting ends of the bias-cut layer,—some of the strands extending only half way across. In order to overcome that difficulty, it would have been necessary to cut off, at each end of the layer, a piece having a length equal to the width of the layer, which would have involved an excessive waste of material. Accordingly, in making up the fabric, it became necessary to reverse the relative arrangement of the warp to the filler, so that, in the new fabric, the filler is substituted for the warp, thereby permitting the material to be cut on the bias and insuring that both the strands or heavy bundles of threads, and the weft threads should extend from bead to bead of the tire.

Another defect in our patented construction, which we have overcome in our present tire, resulted from the fact that our fabric did not have smooth surfaces. On the contrary the strands to some extent gave the fabric a ribbed structure, there being crevices between the stands. Indeed, as stated in the patent, we contemplated employing these crevices on the inner surface of the carcass to provide storage for the talc or lubricator which is customarily used between the inner tube and casing. In the further use, however, it was found that if one layer of the carcass became detached or loosened from its contacting layers, in one or more spots, (due to heavy blows, defects in manufacture or other causes), the layers would rub and chafe on each other, and because of the slightly ribbed structure of the fabric, that this chafing tended to weaken the tire and to occasion blow-outs. In our present structure, we have provided a fabric having smooth surfaces, thereby remedying this defect.

In the accompanying drawings, we have illustrated the construction of our new tire and also the novel fabric employed therein. In these drawings:

Figure 1 is a side elevation of a portion of a tire casing with some of the parts broken away in order to illustrate the arrangement of the strands and connecting threads in the successive layers of fabric;

Fig. 2 is a transverse sectional view through a tire casing;

Fig. 3 is a plan view of a piece of our new fabric as woven and before being coated with rubber and compressed;

Fig. 4 is an enlarged transverse sectional view taken substantially on the line 4—4 of Fig. 3;

Fig. 5 is an enlarged longitudinal sectional view taken substantially on the line 5—5 of Fig. 3;

Fig. 6 is a plan view of a strip cut on the bias from the fabric illustrated in Fig. 3 after the latter has been rubber coated and compressed;

Fig. 7 is an enlarged sectional view taken substantially on the line 7—7 of Fig. 6; and Fig. 8 is an enlarged view taken substantially on the line 8—8 of Fig. 6.

Referring to the drawings, our improved fabric as woven is illustrated in Fig. 3 and consists of the strands 10 arranged closely side by side, interwoven with the small threads 11 which are spaced apart. Each of the strands it will be observed is flat and comprises a plurality of small threads 12 arranged parallel to each other in superposed layers, as shown in Fig. 4. Preferably the strands are the warps of the fabric and the threads 11 the wefts.

The fabric is woven in lengths as wide as possible and its structure is such that it becomes a dense flat sheet when subjected to pressure. In preparing the fabric for the carcass of tires a length of the same is passed through a thin bath comprising rubber dissolved in a hydro-carbon such as gasolene. By reason of the fabric's softness and pliability the liquid rubber penetrates entirely through the same thereby coating, not only the outer surfaces, but also the surfaces of all the threads in the strands. As the liquid dries, the rubber is deposited on all the surfaces of all the threads. Consequently, the threads are provided with a coating which holds them together and further, acts to eliminate the destructive chafing of one thread on another, which so quickly wear out tires in actual service.

After having "spread" the fabric as just described, a thin layer of rubber is applied to both surfaces thereof, being secured by the rubber cement or coating previously applied. These layers of rubber are very thin and may be applied by passing the cement coated fabric through a "skimming" machine. Usually this machine comprises a series of parallel rollers between a pair of which the fabric is passed. The rubber is supplied to the upper roll and is applied thereby to the fabric, the two rolls being forced toward each other with considerable force whereby the rubber sheet is pressed onto the fabric and the fabric itself compressed into a dense sheet of uniform thickness as shown in Figs. 6, 7 and 8. After the layer of rubber has been applied to one surface, the fabric is reversed and passed through the machine a second time to have a rubber sheet applied to the other surface thereof.

The rubber coated fabric is then cut on the bias as indicated by the dotted lines *a—a* and *b—b* Fig. 3, to give strips as illustrated in Fig. 6, the width thereof being such that the strip may extend from bead to bead of the tire.

As stated, the strip of Fig. 6 is cut from the fabric illustrated in Fig. 3 after the latter has been coated with rubber cement and had the thin layers of rubber applied to its surfaces. It is obvious, however, that the bias strip may be rubberized after being cut from fabric which has not been rubber treated. The change in the cross sectional shape of the strands, after the faric has been compressed is apparent from a comparison of Figs. 4 and 7. The former shows the fabric as woven, whereas the latter shows it after being rubber impregnated, coated and compressed. The thin surface covering rubber layers, 13 and 14, are not so thick but what the outline of the threads 11 and 12 can be distinguished to some extent, as shown in Fig. 6, although the outlines have been exaggerated, as it is impossible to illustrate them with pen and ink as they really appear. Although the fabric has not been subjected to as great a pressure as follows later in the mold, it will be seen from Fig. 7 that the strands have been compressed into very nearly quadrangular shape in cross section. Furthermore, the whole fabric has been flattened out into a sheet of substantially uniform thickness there being no crevices between the strands. Because the strands are compressed their cross sectional area is less thereby permitting the cross threads 11 to extend from edge to edge of the fabric in a broken line; thus a straight portion of a cross thread is on top of one strand, and a straight portion on the bottom of the next strand, the said portions being connected by a portion passing between the strands in a substantially straight line. Furthermore, the threads or members which form the strands are substantially straight (see Fig. 8) not being curved as in the uncompressed fabric (see Fig. 5). Because of this structure the individual threads of the strands are not displaced nor do they chafe on one another or the cross threads 11 to any appreciable extent when subjected to varying tensions in the tire. Moreover, as the strands themselves are flat and straight, the strands of one layer of fabric in the tire do not chafe the strands in another layer.

As the threads forming the strands and therefore the strands extend in substantially straight lines, the fabric is inextensible in the direction of the strands. In the direction of the cross or connecting threads or at right angles to the strands, however, the fabric is readily extensible. This property follows from the fact that the cross threads extend through the fabric in broken lines as distinguished from straight lines. Hence any tension applied in the direction of their length, tends to change them from broken to straight lines, thereby permitting the fabric to be stretched in this direction. These features, namely, the inextensibility of the fabric in the direction of the strands and its extensibility in the direction of the cross threads, we believe explain certain important advantages of our tire, which will be described later.

The strip of Fig. 6 therefore comprises a rubber coated and impregnated fabric consisting of oblique or diagonal strands which are connected by spaced threads, each of the strands being made up of a bundle of threads which has been pressed into a substantially solid mass, polygonal in cross section, and with the side of one strand in contact throughout its surface with a side surface of the next strand. The strip, therefore, in effect is a dense sheet of uniform thickness consisting of innumerable small parallel threads arranged in superposed layers, extending from edge to edge thereof, and held against displacement.

The strip shown in Fig. 6, the length of which is only limited by the width of the fabric shown in Fig. 3 and may be sufficient to form a layer of the tire carcass, is placed on the core and shaped thereto to form a layer, as 15, the edges being arranged around the beads 17. As is well known, the circumferential length of the tire at the tread is greater than at the beads and consequently the fabric must be tucked in at the beads or stretched at the tread to compensate for the difference in lengths. Fabric tires which are tucked in at the beads are therefore weak in resistance to circumferential tension at the beads. Cord tires, on the other hand have the cords slightly spaced at the tread and close together at the beads. Consequently their resistance to penetration at the tread is not a maximum. In shaping our fabric to the core, we preferably stretch the fabric slightly at the tread and compress it circumferentially at the beads, thereby compensating for the different lengths. The inner layer 15 of fabric is placed on the core, as shown in Figs. 1 and 2, the strands being arranged obliquely preferably at an angle of substantially 45° to the longitudinal direction of the tire, and the connecting threads 11 therefore are also at an angle of 45° to the longitudinal direction of the tire since they are at 90° to the strands. Although the strip is inextensible in the direction of the strands, and readily extensible in the direction of the cross threads, as explained above, it may be stretched to a slight degree in a direction making 45° to the strands, that is in a direction longitudinally of the tire. This permits the tread portion to be stretched slightly to allow for some of the difference in the length of the circumferences at the tread and beads. After placing one layer 15 on the core as described, another layer 16 or layers are positioned in the same manner except that the direction of the strands alternates in successive layers, that is to say if the strands of the first layer for instance, extend obliquely from bead to bead in one direction the strands of the second layer extend obliquely from bead to bead in a reversed direction, so that the direction of the strands in successive layers makes an angle of about 90°. The number of layers of our fabric depends on the size of the tire and the service for which it is designed. For example, a 34x4 tire for pleasure cars has three or four layers of our fabric, and is stronger than any fabric tire with its seven or nine layers of fabric or any cord tire with two layers of large cords or seven or nine layers of small cords.

The edge portions of the strips may be secured to the beads in any desired manner, and the rubber tread 18 is applied in the usual way, a breaker strip 19 being employed if desired.

After the carcass of the tire has been built up and the rubber tread attached, the mold is applied and the entire tire is subjected to pressure and vulcanized. This pressure further compresses and flattens the layers of our fabric. At the tread portions of the fabric, where perhaps, the strands have been slightly separated by the stretching mentioned above, this pressure compresses and flattens the strands so that the sides thereof are pressed into direct contact again thereby forming a dense imperforate layer of fabric of substantially uniform thickness.

It will be evident from the foregoing description that our fabric, because it has strength in all directions as distinguished from layers of cords which have no substantial strength at right angles to their length, can be laid on the core with minimum labor like the ordinary fabric strips, and the manufacture of a carcass from our fabric requires less labor than the usual fabric casing for the reason that a less number of strips are used. Furthermore, our tire is stronger than the cord tires and resembles them in the desirable feature of having the greatest tensional strength of each layer obliquely or diagonally. Again our tire requires less rubber than either the fabric or cord tires, as the latter has each cord embedded in a sheaf of rubber and the former has a layer of rubber between each of the many layers of fabric. Moreover the structure of the fabric is such, and it is incorporated in the tire in a manner, that practically eliminates internal friction in the layers of fabric themselves, and of one layer on another.

This latter feature follows from the fact that the fabric is of uniform thickness, has smooth surfaces and is inextensible in one direction. With the usual form of woven fabric a stress in any direction causes a strain or stretch in that direction, this resulting from one set of threads tending to straighten out from their tortuous path through the fabric. Obviously this straightening movement causes the one set of threads to chafe or saw on the other set. As the stress in the tire changes there is corresponding chafing which soon results in a blow-out. In our tire, on the other hand, any stress is resisted by the inextensible strands of one or another of the layers of the carcass. Thus if the tire is stressed in the direction of the cross threads of one layer, these threads will not be stretched, because the inextensible strands of the next layer which extend in the same direction as said threads will resist the strain. Furthermore if the tire is stressed in a direction which is different from that in which the strands of any of the layers extend, such stress would be resisted by the strands of two or more layers acting together. In other words the force causing the stress would in effect be divided into two components, one acting in the direction of the strands of one layer and the other component in the direction of the strands of another layer. In this manner all the forces acting to deform the tire or stress the fabric are resisted by the strands, thus relieving the cross threads. Hence as the cross threads are not stretched there is no chafing of the same on the strands. Moreover, as the strands consist of bundles of straight parallel threads, there is no chafing of one strand on another.

Although a specific embodiment of the invention has been disclosed, it is to be understood that changes except as limited by the appended claims may be made without departing from the spirit of the invention.

Having thus described our invention what is claimed as new and desired to be secured by Letters Patent is:

1. A vehicle tire casing including two superposed strips of fabric each strip comprising flat strain resisting strands made up of a plurality of straight threads in superposed layers, said strands being interwoven with spaced relatively weak threads, the strands and latter threads each extending obliquely from bead to bead of the tire and the strands of the two strips extending in opposite directions.

2. A vehicle tire casing including two superposed strips of dense uniformly thick fabric, each strip comprising flat strain resisting strands having their sides in contact with one another and made up of a plurality of straight threads in superposed layers, said strands being interwoven with spaced relatively weak threads, the strands and latter threads each extending obliquely from bead to bead of the tire and the strands of the two strips extending in opposite directions.

3. A vehicle tire casing including two superposed strips of fabric, each strip comprising flat strands made up of a plurality of straight threads in superposed layers, said strands being interwoven with spaced threads, the strands being straight and the threads extending in a broken line whereby said strips are substantially inextensible in the direction of the length of the strands and yielding in the direction of the threads, the strands and threads each extending obliquely from bead to bead of the tire and the strands of the two strips extending in opposite directions.

4. A vehicle tire casing including two superposed strips of fabric, each strip comprising flat strands made up of a plurality of straight threads in superposed layers, the strands being straight and interwoven with spaced threads undulating over and under successive strands, the fabric being rubber impregnated and coated and compressed into a sheet of substantially uniform thickness and being inextensible in the direction of the length of the strands, whereby the stresses due to air pressure and traction are resisted by the strands and the connecting threads are substantially unstressed.

5. A vehicle tire casing including two superposed strips of fabric each strip comprising flat strands substantially quadrangular in cross section interwoven with spaced connecting threads, each strand consisting of a plurality of straight threads disposed in superposed layers, the strands and connecting threads each extending obliquely from bead to bead, and the strands of the two strips extending in opposite directions.

6. A vehicle tire casing including two superposed strips of fabric each strip comprising flat strands interwoven with undulating cross threads, the strands being substantially quadrangular in cross section and the side of one strand being in contact throughout its surface with a side of the adjacent strand, the strands and cross threads each extending obliquely from bead to bead and the strands of the two strips extending in opposite directions.

7. A vehicle tire casing including two superposed strips of fabric each comprising flat straight warps interwoven with spaced undulating weft threads, the warps made up of straight threads arranged in superposed layers, the warps and wefts of each strip extending obliquely from bead to bead and the warps of the two strips extending in opposite directions.

8. A vehicle tire including two layers, each layer comprising a dense sheet of substantially uniform thickness and consisting of straight parallel threads arranged in superposed layers and spaced connecting threads extending at an angle of substantially 90 degress to the first mentioned threads to resist lateral separation of the latter in making the tire, the first mentioned threads extending obliquely from bead to bead and in opposite directions in the two layers.

9. A vehicle tire casing including in combination two superposed layers, each layer consisting of parallel threads arranged in superposed layers and the threads of one layer extending substantially at right angles to the threads of the other layer.

In testimony whereof we affix our signatures.

HANS E. GRABAU.
A CHARLES SCHWARTZ.